United States Patent [19]

Bloomquist et al.

[11] Patent Number: 4,881,209
[45] Date of Patent: Nov. 14, 1989

[54] METHOD OF PROCESSING CONVERTED MODE SEISMIC DATA

[75] Inventors: Marvin G. Bloomquist, Lewisville; Barry N. Warner, Duncanville, both of Tex.

[73] Assignee: Mobil Oil Corporation, New York, N.Y.

[21] Appl. No.: 256,674

[22] Filed: Oct. 12, 1988

[51] Int. Cl.⁴ .............................................. G01V 1/36
[52] U.S. Cl. ......................................... 367/52; 367/75; 364/421
[58] Field of Search .................... 367/38, 50, 52, 75; 364/421

[56] References Cited

U.S. PATENT DOCUMENTS 4,596,005 6/1986 Frasier ................................ 367/38
4,597,066 6/1986 Frasier ................................ 367/38
4,611,311 9/1986 Frasier ................................ 367/38

OTHER PUBLICATIONS

John T. Bellatti, "A Field Investigation Comparing Conventional Compressional-Wave, Converted-Wave, and Horizontally-Polarized Shear Wave-Reflections"; Aug. 10, 1981.
John E. Graves, "A P-SV Converted Wave Reflection Seismic Prospecting System"; Sep. 7, 1979.

Primary Examiner—Thomas H. Tarcza
Assistant Examiner—Ian J. Lobo
Attorney, Agent, or Firm—Alexander J. McKillop; Charles J. Speciale; George W. Hager, Jr.

[57] ABSTRACT

Method for processing converted mode seismic data. Compressional and converted compressional to shear wave data is acquired by generating compressional energy into a subsurface formation and recording the amplitude of reflections as a function of time at spaced locations along a line of exploration. A series of compressional to shear wave velocity (Vp/Vs) ratios are selected based on an analysis of the acquired seismic data and the shear wave velocity for each Vp/Vs ratio is determined according to the following relationship:

$$Tnmo = \sqrt{\left(\frac{x}{Vp} \frac{k}{1+k}\right)^2 + T^2} + \sqrt{\left(\frac{x}{Vp} \frac{k}{1+k}\right)^2 + (kT)^2}$$

where k=Vp/Vs. Data corresponding to each Vp/Vs ratio is stacked together, the series of stacks are correlated to the originally acquired seismic data to determine the actual Vp/Vs ratio for the formation and the shear wave velocity is derived. The originally collected data is then corrected for normal moveout and stacked.

9 Claims, 7 Drawing Sheets

METHOD OF PROCESSING CONVERTED MODE SEISMIC DATA

BACKGROUND OF THE INVENTION

The present invention relates to a method for processing converted mode seismic data and, more particularly, to a method for extracting shear velocities from conventionally recorded compressional mode data and performing normal moveout correction and stacking of the acquired P-SV converted wave seismic data.

The use of compressional, or P, wave reflection data in geophysics analysis is well known. A typical seismic reflection prospecting system which produces compressional wave reflection data would be comprised of a compressional wave source located on the surface and geophones spaced along a line of exploration on the surface for measuring the vertical component of the ground motion caused by the reflected compressional wave. However, conventional P waves travelling through the subsurface also produce vertically-polarized shear, or SV, waves capable of being detected by the geophones when reflection of the generated compressional wave off a reflecting interface at other than a normal angle of incidence occurs. Thus, seismic sections produced by such compressional wave seismic exploration systems would contain two types of wave information which, if properly exploited, will yield useful information regarding the lithologic characteristics of the subsurface formation under investigation. In recent years, interest has been growing in obtaining shear wave information to provide useful information regarding the lithological characteristics of the subsurface formation under investigation. Such information, if properly obtained and exploited, can be utilized in conjunction with information obtained from compressional wave seismic section to provide a more detailed analysis of the characteristics of the subsurface formation. For example, compressional wave seismic sections can provide useful information on the compressibility of subsurface formations, while shear wave seismic sections can provide useful information on subsurface formation rigidity.

Several limitations related to the characteristics of the shear wave have, however, prevented the full exploitation of shear wave information. Shear wave seismic reflections are noisier than compressional wave seismic reflections, making proper interpretation difficult. Furthermore, detecting shear wave reflections is more difficult than detecting compressional wave reflections since shear wave reflections are typically of much lower amplitude than compressional wave reflections. Finally, the direct propagation of a shear wave into a subsurface formation to induce a shear wave reflection requires special transducers and additional steps over and above those required for obtaining compressional wave reflection data. This makes obtaining shear wave reflection data difficult, more costly and time-consuming.

While difficult to obtain, shear wave data can be very useful in the exploration for hydrocarbons. Hydrocarbon deposits which produce compressional wave reflection amplitude anomalies do not produce similar shear wave reflection amplitude anomalies. Such a result occurs because shear waves do not respond to any fluids and therefore do not produce different amplitude responses for gas, oil, and water. In contrast, compressional wave amplitude anomalies that are caused by anomalous lithologies such as salt, coal and hard streaks usually have equally anomalous shear wave behavior. Such an application of shear wave information has not been widely exploited, however, because most amplitude anomalies of interest occur offshore while shear wave seismic data can only be recorded onshore.

When both P-wave and S-wave velocity information are available from field measurements, the simple ratio Vp/Vs may provide an estimate of the lithology. Use of the ratio in seismic work has the advantage of not requiring density information. The shear wave velocity of a porous rock has been shown to be less sensitive to fluid saturants than the compressional wave velocity. Thus, observation of the ratio of the seismic velocities for waves which traverse a laterally varying zone of gas or oil saturation could produce an observable anomaly which is independent of the regional variation in compressional wave velocity.

The publication entitled *A Field Investigation Comparing Conventional Compressional-Wave, Converted-Wave, and Horizontally-Polarized Shear Wave Reflections* by John T. Bellatti reported the use of a seismic prospecting system capable of generating compressional waves into a subsurface formation and recording converted P-SV data reflected off subsurface reflecting interfaces. While only Bellatti is discussed in detail below, similar teachings may be found by reference to the publication entitled *A P-SV Converted Wave Reflection Seismic Prospecting System* by John E. Graves.

Bellatti discloses that for a flat layer converted P-SV wave, the travel time equation for the formation may be represented as follows:

$$t_x = \left( t_{po}^2 + \frac{X_p^2}{V_p^2} \right)^{\frac{1}{2}} + \left( t_{so}^2 + \frac{X_s^2}{V_s^2} \right)^{\frac{1}{2}} \tag{1}$$

where:
$t_x$ = travel time;
$V_p$ = compressional wave velocity;
$V_s$ = shear wave velocity
$X_p$ = source--CDP offset;
$X_s$ = CDP--receiver offset;
$t_{po}$ = vertical travel time of the P wave; and
$t_{so}$ = vertical travel time of the S wave.

Bellatti also discloses that the travel time may be represented in terms of a Vp/Vs ratio. More specifically, Bellatti provides that:

$$t_x = (t_{po}^2(1+K^2)+X^2/(Vp^2/K))^{\frac{1}{2}} \tag{2}$$

where:
K=Vp/Vs; and
$t_{so} = Kt_{po}$.

Bellatti, however, relied upon separate P, P-SV and SH exploration systems and data gathers for collection and processing of seismic data. Extraction of shear wave velocities from conventionally recorded compressional mode data and performing normal moveout correction and stacking of a shot record including both P and P-SV data where the correction and stack takes the extracted shear wave information into account was nowhere contemplated by Bellatti. Such multiple exploration and multiple processing techniques is both time consuming and expensive.

When seismic data is processed to attempt to extract shear wave velocity information from compressional wave information, numerous problems arise. The most serious problem associated with such types of processing is that such estimates are extremely sensitive to normal moveout problems. Correcting for time or velocity so that nearly perfect time alignments are produced from trace to trace for every reflector in the CDP gather is required to prevent the introduction of velocity errors.

When determining the appropriate stacking velocities for compressional to vertical shear seismic data, the most commonly performed technique estimates the compressional and shear velocities as a function of seismic recording time. From these velocities, an appropriate P-SV velocity time function is calculated. This function is used to perform normal moveout and is followed by stacking and display for subsequent analysis, event identification and correlation to standard compressional wave seismic data. Such techniques typically assume an NMO function of the form:

$$Tnmo = (x^2/Vpsv^2 + Tpsv_0^2)^{\frac{1}{2}} \qquad (3)$$

where:
Tpsv$_0$ = two way travel time within the media;
Vpsv = modified velocity within the media estimated experimentally from P and SV estimates; and
x = source-receiver offset.

Such a technique does not permit easy identification of P-SV events for comparison with the standard P wave section.

SUMMARY OF THE INVENTION

It is an object of the invention to stack converted P-SV events after correction for normal moveout.

It is a feature of the invention to provide a method of extracting shear wave information from recorded compressional waves.

It is another feature of the invention to correct seismic data for normal moveout based on the relationship of the ratio of the velocity of compressional waves through the media and the velocity of shear waves through the media.

It is yet another feature of the invention to correct seismic data for normal moveout utilizing compressional and shear wave velocities acquired by processing compressional wave data acquired during seismic exploration.

Seismic data comprised of compressional wave (P) events and converted compressional to shear wave (P-SV) events is acquired by generating compressional energy into a subsurface formation and recording the amplitude of reflections as a function of time at spaced locations along a line of exploration. A series of compressional to shear wave velocity (Vp/Vs) ratios are selected based on an analysis of the seismic data and the data corrected for normal moveout for each of the selected ratios according to the following relationship:

$$Tnmo = \sqrt{\left(\frac{x}{Vp} \frac{k}{1+k}\right)^2 + T^2} + \sqrt{\left(\frac{x}{Vp} \frac{k}{1+k}\right)^2 + (kT)^2}$$

where k = Vp/Vs. Each collection of traces corresponding to a selected Vp/Vs ratio are stacked and the series of stacks are correlated to the originally collected seismic data corrected and stacked at the compressional wave velocity. The correlation is analyzed to determine the correct Vp/Vs ratio and the shear wave velocity is derived from the determined ratio. The originally collected data is then corrected for normal moveout and stacked based on the determined compressional and shear velocities in accordance with the following relationship:

$$Tnmo = \sqrt{\frac{Xp^2}{Vp^2} + Tp^2} + \sqrt{\frac{Xs^2}{Vs^2} + Ts^2}$$

The above and other objects, advantages and features of the invention will be more readily understood from the following detailed description of the invention, which is provided in connection with the accompanying drawings.

DETAILED DESCRIPTION OF THE INVENTION

Figure 1:
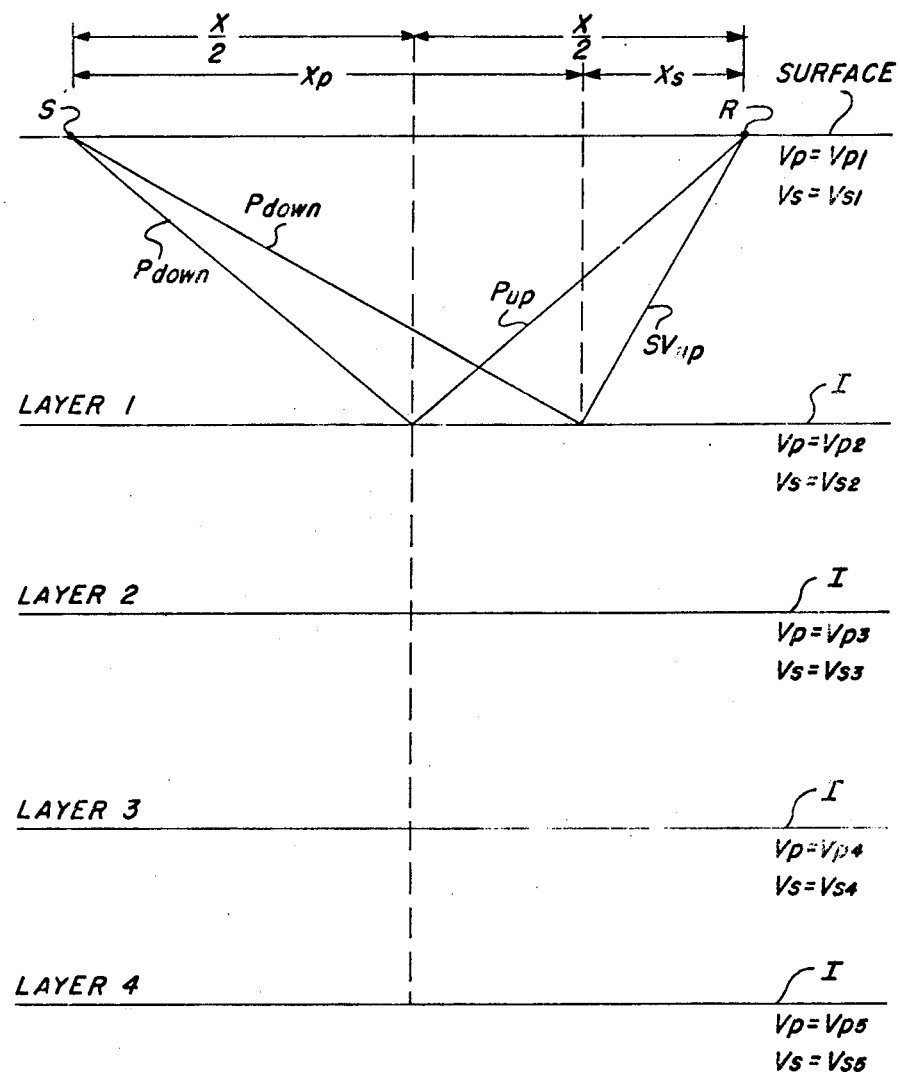
FIG. 1 illustrates a four layer earth formation model utilized to generate the seismic shot record illustrated in FIG. 2 and typical raypaths for a P-P and P-SV waves within the illustrated formation.

Turning first to FIG. 1, a cross-sectional view of a four layer earth model where each layer has different geological characteristics is shown. The illustrated earth model is explored using conventional geophysical exploration techniques to generate the shot record illustrated in FIG. 2. As is often the case, each of the illustrated layers is characterized by compressional wave velocities Vp and shear wave velocities Vs which differ from layer to layer.

While seismic exploration systems may be comprised of a plurality of seismic sources and/or receivers, FIG. 1 illustrates a single compressional wave source S and a single seismic receiver R separated by an offset X. During seismic exploration, seismic source S will generate compressional waves downwardly into the subsurface formation. The raypaths $P_{DOWN}$ of two such downwardly travelling compressional waves may be seen in FIG. 1. When a compressional wave P$_{DOWN}$ passes through a layer and reaches a reflecting interface I, a compressional wave having a raypath PUP and a converted shear wave having a raypath P-SV$_{UP}$ are reflected back towards the surface.

Figure 2:
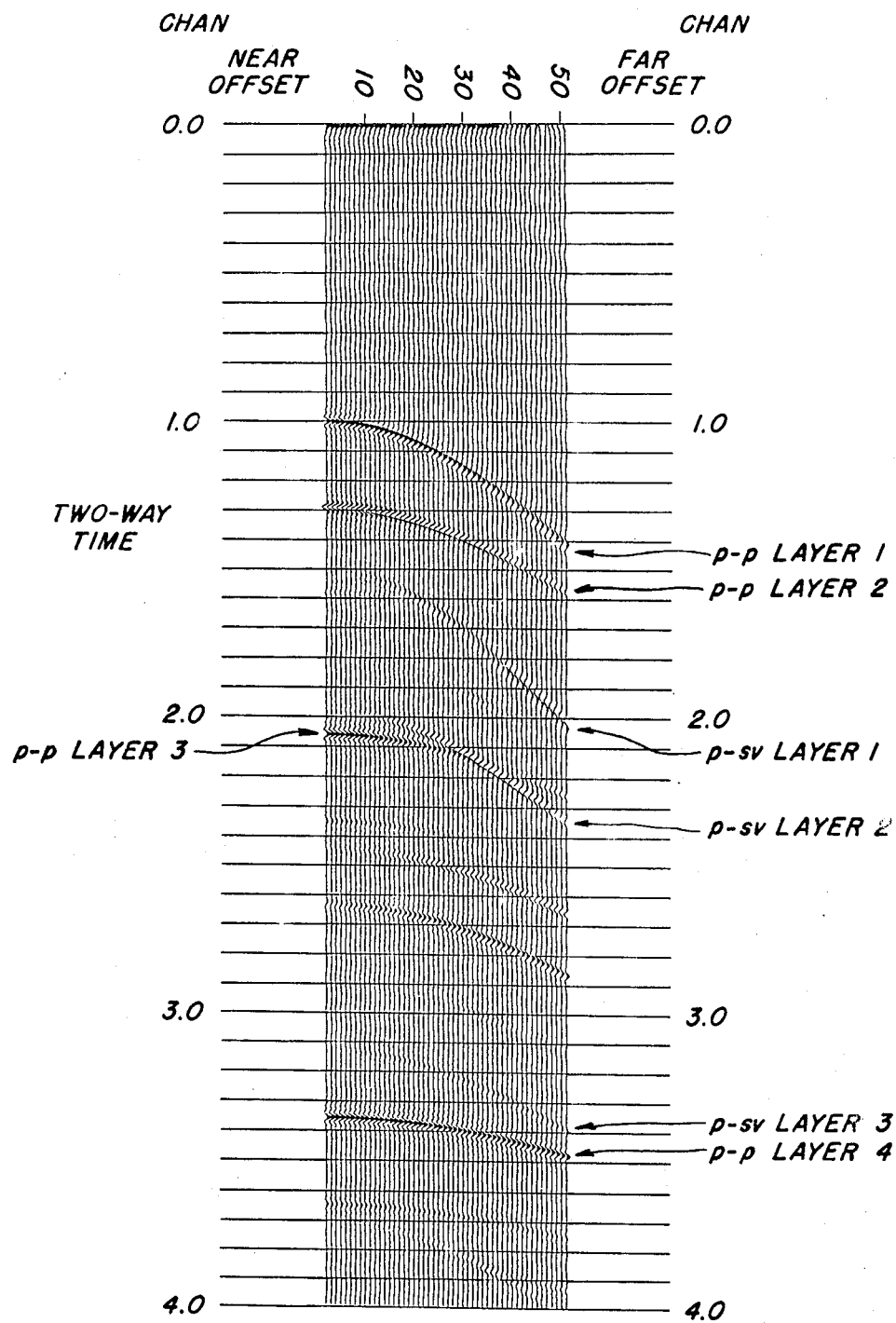
FIG. 2 illustrates a shot record produced by the generation of seismic energy into the four layer earth formation illustrated in FIG. 1.

Turning next to FIG. 2, the x-t shot record produced by generating seismic energy into the four layer earth formation illustrated in FIG. 1 may now be seen. The compressional waves reflected off each layer and detected by the seismic detectors are indicated in FIG. 2 as the P-P (Compressional to Compressional) event for that layer. The converted shear waves reflected off each layer and detected by the seismic detectors are indicated as P-SV (Compressional to Shear) events for that layer. The fourth layer P-SV event is not illustrated as it arrives too late in time to be recorded. The remaining unlabelled seismic events are, for the predominant part, interbed P wave multiple reflections.

As the reflection events are detected by seismic detectors increasingly distant from the source, the arrival time of the events becomes increasingly long. Such a systematic shift to longer reflection times due to increasing source-receiver offsets is generally referred to as normal moveout or NMO. It is well known that normal moveout causes errors in determining compressional and shear wave velocities which, if uncorrected, will misalign stacked amplitudes of seismic events, thereby masking the true behavior of the reflecting interfaces.

Figure 3:
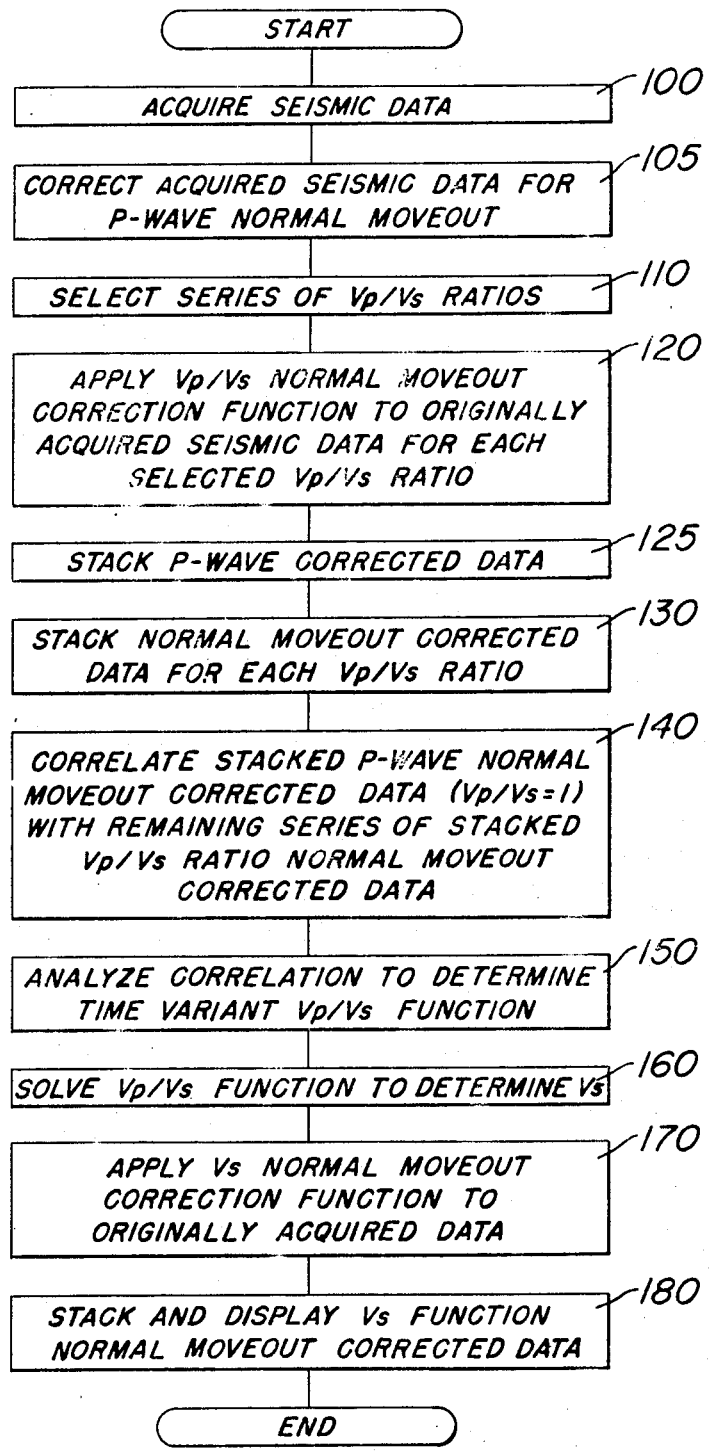
FIG. 3 illustrates, in flow chart form, a method for extracting shear velocities from conventionally recorded compressional mode data, correcting the extracted data for normal moveout and stacking the corrected extracted data.

Turning next to FIG. 3, the method of extracting shear wave velocities from conventionally recorded compressional mode data, correcting the collected P-SV data for normal moveout by applying the determined shear wave velocities, and stacking the corrected data is now described.

The method of the present invention commences at step 100 with the acquisition of seismic data through the utilization of well known seismic exploration techniques for generating compressional energy into a subsurface formation. For example, an artificial disturbance may be generated along the earth by the use of dynamite or the like. The resulting compressional waves travel downwardly in the earth and are reflected upwardly by subsurface reflecting interfaces. The reflected waves are received at geophones or other detectors located along the surface and recorded in reproducible form as seismograms. Seismic traces which would be acquired by a typical seismic survey may be seen by reference to FIG. 2. The seismic traces depicted in FIG. 2 represent the amplitude of seismic reflections as a function of time and distance along a line of exploration in the x direction of the earth's surface. These traces have been gathered into an x-t array commonly referred to as a "shot record".

Proceeding to step 105, the shot record illustrated in FIG. 2 is corrected for P-wave normal moveout by applying the compressional wave velocity to the shot record. Correction for P-wave normal moveout is accomplished by applying Equation (4) set forth below to the shot record.

$$Tnmo = (x^2/Vp^2 + T^2)^{\frac{1}{2}} \quad (4)$$

where:
Tnmo = normal moveout corrected travel time;
Vp = average compressional wave velocity;
x = source-receiver offset; and
T = two-way normal incidence travel time.

Figure 4:
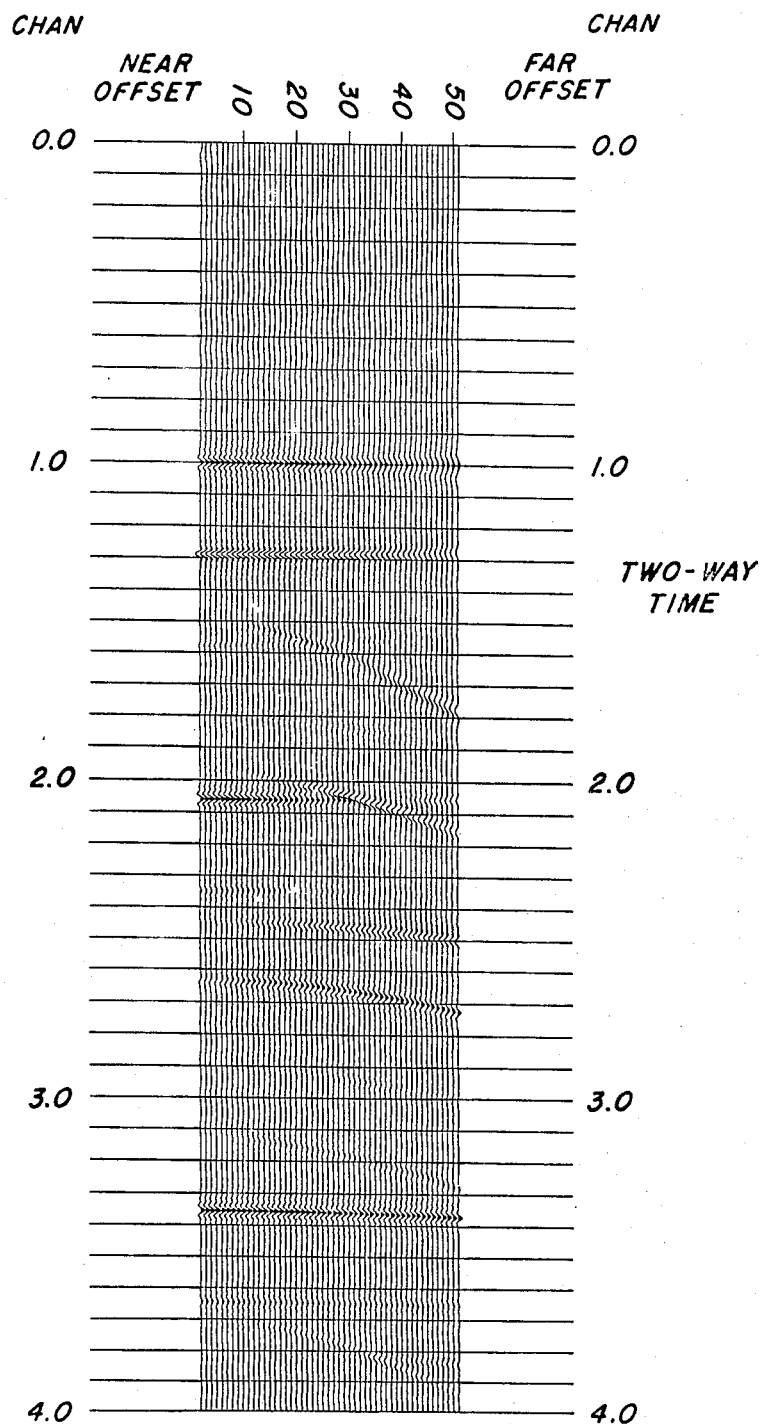
FIG. 4 illustrates the shot record illustrated in FIG. 2 after correcting for normal moveout by applying the compressional wave velocity.

The P-wave normal moveout corrected shot record may be seen by reference to FIG. 4.

Proceeding to step 110, a series of Vp/Vs ratios are selected where Vp is the average velocity of the compressional waves and Vs is the average velocity of the shear waves. The range of the selected series of Vp/Vs ratios may be determined from the shot record acquired during seismic exploration. For example, in FIG. 2, the reflected P-SV wave travel time varied from the initial reflected P-P travel time by a range of 1.5 to 2.1 times. A Vp/Vs ratio range of 1.5 to 2.1 would therefore be an acceptable estimate. The interval, or time separation, between a pair of Vp/Vs ratios in the selected range should be determined by the sampling interval for the seismic record. For the illustrated example, a sampling interval of 0.03 is satisfactory.

As set forth in the background section of this application, prior normal moveout correction formula utilized a modified wave velocity experimentally determined from P and SV estimates which did not permit easy identification of P-SV events for comparison with the standard P wave section. It is an aspect of our invention to apply a novel normal moveout correction function to estimates of the Vp/Vs ratio such that the P-SV events may be readily correlated to the P wave section. The aforementioned novel normal moveout correction function to be applied to estimates of the Vp/Vs ratio is set forth below as Equation (5):

$$Tnmo = \sqrt{\left(\frac{x}{Vp} - \frac{k}{1+k}\right)^2 + T^2} + \sqrt{\left(\frac{x}{Vp} - \frac{k}{1+k}\right)^2 + (kT)^2} \quad (5)$$

where:
Tnmo = normal moveout corrected travel time;
Vp = average compressional wave velocity;
Vs = average shear wave velocity;
k = Vp/Vs;
x = source-receiver offset; and
T = compressional wave travel time.

Proceeding to step 120, the Vp/Vs normal moveout correction function set forth in Equation (5) is applied to the originally acquired seismic data for each of the selected Vp/Vs ratios within the previously determined Vp/Vs ratio range. For example, FIG. 5 illustrates the shot record of FIG. 2 after applying the Vp/Vs normal moveout function for Vp/Vs ratios of 1.97, 2.00 and 2.03.

Figure 5:
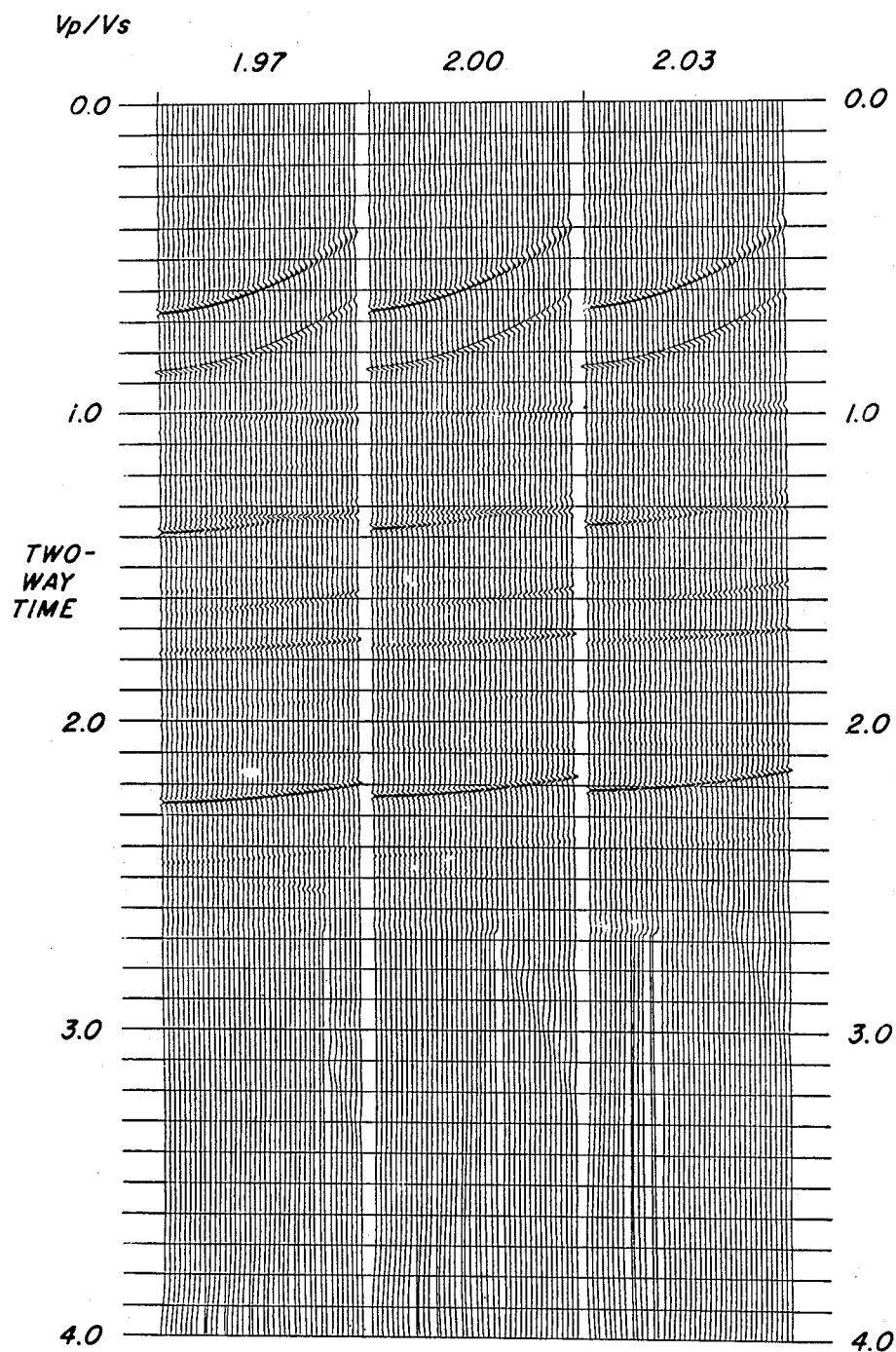
FIG. 5 illustrates the shot record illustrated in FIG. 2 after applying the Vp/Vs normal moveout function to the shot record for a series of 3 Vp/Vs ratios.

To analyze a display such as that illustrated in FIG. 5, careful attention should be paid to the event corresponding to the reflection of the P-P wave off the first reflecting interface. For the example shown in FIG. 5, this event occurs at approximately 1.0 second. It has been discovered that for the relationship set forth by Equation (5), the selected Vp/Vs ratio will closely approximate the actual value for Vp/Vs if the application of the aforestated relationship corrects the P-SV wave corresponding to the first reflecting interface for normal moveout by flattening the P-SV wave such that the P-SV event occurs at the same time as the corresponding P-P wave. Thus, for FIG. 5, the Vp/Vs ratio which is approximately equivalent to the actual Vp/Vs ratio for the formation will correspond to the display which illustrates the P-P wave corresponding as flat and aligned at about 1.0 seconds. In FIG. 5, the event is below 1.0 second and slightly undercorrected, i.e. concave down, for Vp/Vs=1.97. At Vp/Vs=2.00, the event is flat and aligned at 1.0 sec. At Vp/Vs=2.03, the event occurs above 1.0 second and is overcorrected, i.e. concave up. In accordance with the methods set forth above, it may therefore be determined that the Vp/Vs ratio for the formation under investigation is 2.00.

In many situations, it will be desirable to further process the data to more precisely determine the desired Vp/Vs ratio. In order to accomplish such an objective, the P-Wave corrected data is stacked at step 125 and, at step 130, the normal moveout corrected data for each Vp/Vs ratio are stacked. By use of the term "stacking", it is intended to refer to techniques which time shift and sum the seismic traces recorded at each geophone to thereby combine the seismic traces. The desired stacking may be accomplished by the application of any one of numerous techniques well known to those skilled in the art.

Figure 6:
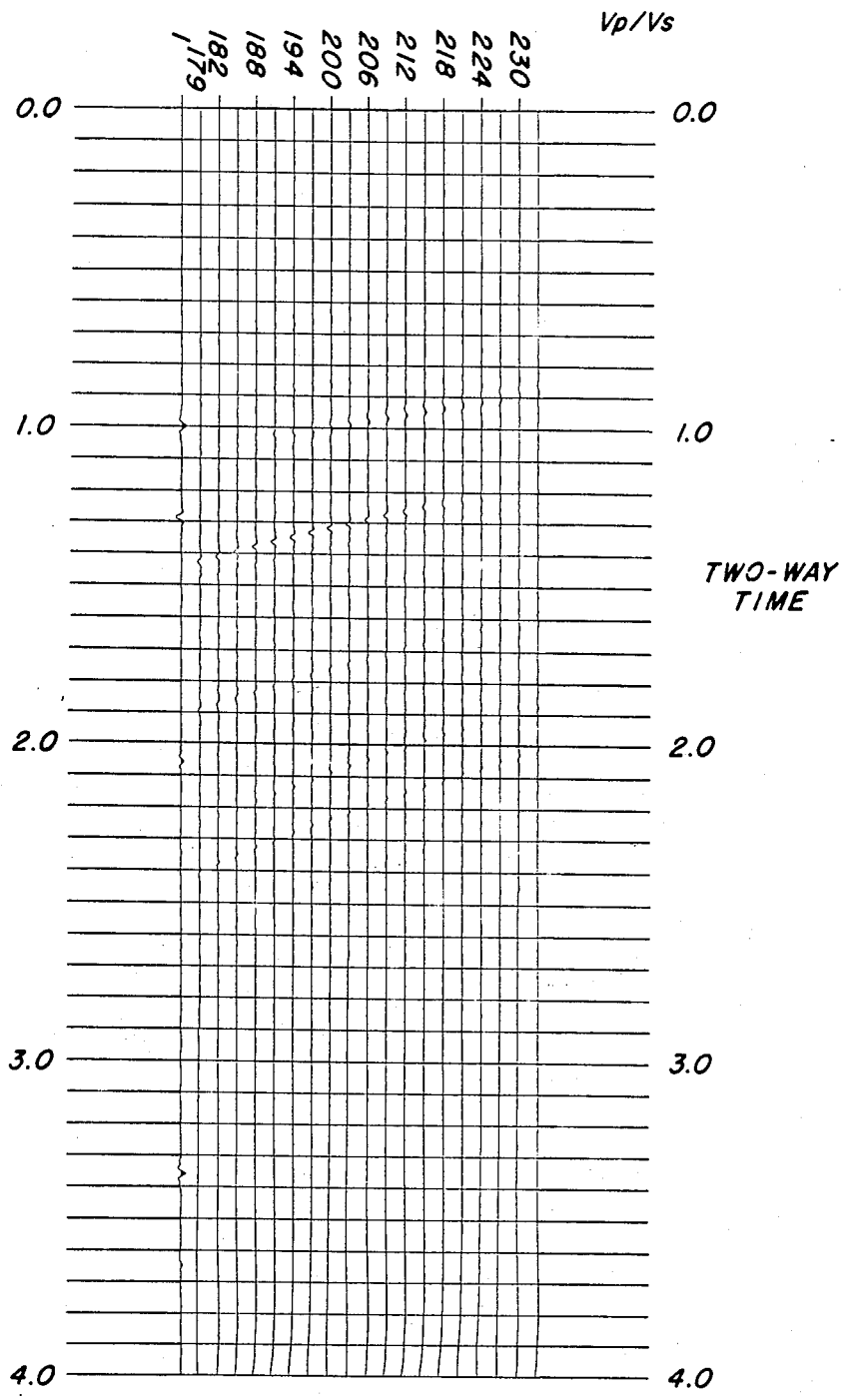
FIG. 6 illustrates the correlation of the stack of the P-wave data illustrated in FIG. 4 and the stack of the Vp/Vs data for 19 data sets including the Vp/Vs data illustrated in FIG. 5.

Proceeding to step 140, the stacked P-Wave corrected data is correlated with the series of stacked Vp/Vs ratio normal moveout corrected data. Correlation is performed by aligning the P-Wave normal moveout corrected data with the series of stacked Vp/Vs ratio normal moveout corrected data. For example, a display may be prepared which displays the stacked P-Wave and the stacked Vp/Vs data side by side so that the time axis for both are aligned. Such a display may be seen by reference to FIG. 6 where the stacked P-wave trace and 19 stacked normal moveout corrected traces of Vp/Vs ratios in the range of 1.79 to 2.33 are illustrated. In the illustrated display, each stack is separated by 0.03.

Next, the stacked P-wave normal moveout corrected data and the series of stacked Vp/Vs ratio normal moveout corrected data are correlated so that the time variant function relating Vp and Vs may be determined. At step 150, the stacked Vp/Vs normal moveout corrected data are analyzed to identify which Vp/Vs ratio stack has an event which coincides with the P event, both in time and in similarity. Referring to FIG. 7 and again considering the 1.0 second example previously discussed, a comparison of each Vp/Vs ratio stack and the P stack indicates that the closest Vp/Vs ratio which includes an event closest to the reference P stack event occurs for the Vp/Vs ratio of 2.00.

Figure 7:
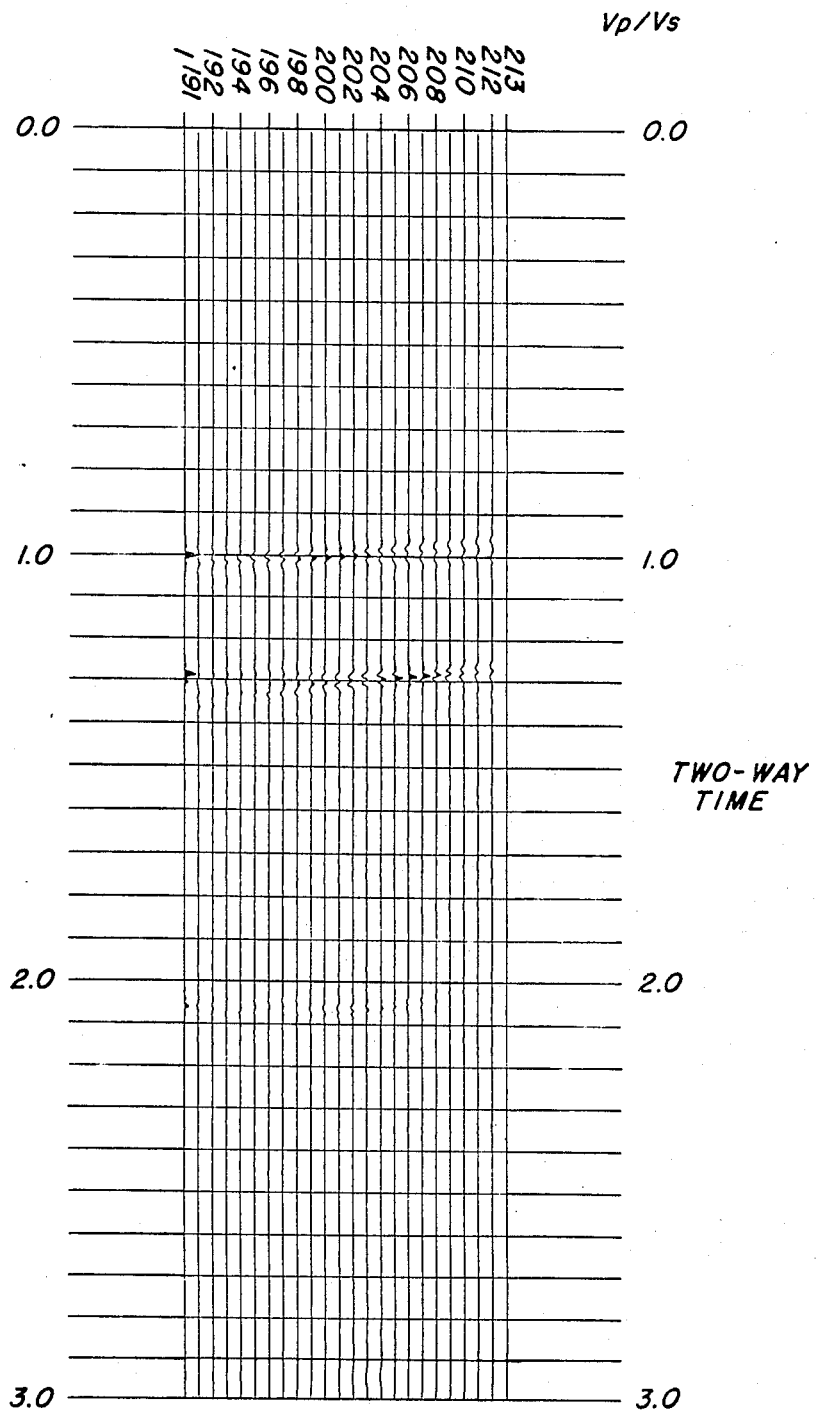
FIG. 7 illustrates a coherent correlation of the P-wave stack illustrated in FIG. 4 and the Vp/Vs stacks for 23 data sets including the Vp/Vs stacks illustrated in FIG. 6.

In yet another alternate embodiment of the invention, a measure of coherency may be prepared to identify the desired coinciding event. Here, the P-wave stack and the Vp/Vs ratio stacks would be made coherent by correlating the amplitudes of the P-wave stack and the Vp/Vs ratio stacks. The method of performing such a correlation of the P-wave stack and the Vp/Vs stacks as well as the method of preparing and displaying a display which clearly shows the coherency of the P-wave stack and the Vp/Vs stacks are well known in the art. FIG. 7 illustrates such a coherency display. Like the above described stack method, the Vp/Vs ratio coherency method compares P and Vp/Vs events to determine coherency. The Vp/Vs line which includes an event closest in time and similarity to the selected corresponding P event is the desired Vp/Vs ratio. For example, FIG. 7 illustrates a coherency display between the P wave stack trace and the P-SV stack traces for the Vp/Vs ratio range of 1.91 and 2.13. The Vp/Vs event which is coherent with the P-wave event occurring at 1.0 second is located on the coherent line calculated for Vp/Vs=2.00.

Proceeding now to step 160, Vs is determined. As Vp may be readily determined from the acquired seismic data by dividing the source-to-receiver offset by the two way travel time of the reflected P wave and as the ratio Vp/Vs was determined at step 150, Vs may now be determined by a straightforward algebraic calculation.

Having determined Vs, the originally acquired seismic data is corrected for normal moveout at step 170 by applying Equation (6) as set forth below to the shear wave velocity determined in accordance with the methods set forth above and the data acquired by the original seismic exploration.

$$T_{nmo} = \sqrt{\frac{X_p^2}{V_p^2} + T_p^2} + \sqrt{\frac{X_s^2}{V_s^2} + T_s^2} \qquad (6)$$

where:
  Tnmo = normal moveout corrected travel time;
  Vp = average compressional wave velocity;
  Vs = average shear wave velocity;
  Xp = source--CMP offset;
  Xs = CMP--receiver offset;
  Tp = compressional wave travel time; and
  Ts = shear wave travel time.

At step 180, the normal moveout corrected data is stacked to combine the seismic traces obtained at the multiple geophone locations. Stacking is again accomplished in accordance with the appropriate teachings of the art. The stacked, moveout corrected data may now be analyzed to determined the characteristics of the subsurface formation being explored, displayed, otherwise stored for later use by applying any one of the innumerable well known techniques for seismic data storage, display and/or analysis.

Thus, there has been described and illustrated herein a preferred embodiment for a method of processing seismic data to extract shear wave velocity information from conventionally recorded compressional mode data and to perform normal moveout correction and stacking of the acquired data by utilizing the extracted shear wave velocity information. However, it will be apparent to those skilled in the art that numerous modifications can be made thereto without departing from the spirit and scope of the invention. Accordingly, the invention is not limited by the foregoing description, but it is only limited by the scope of the appended claims.

What is claimed is:

1. A method of correcting converted compressional to shear (P-SV) seismic data for t effects of normal moveout comprising the steps of:
   (a) selecting a series of compressional wave velocity to shear wave velocity ratios
   (b) determining the P-SV compressional to shear wave velocity ratios from said converted P-SV seismic data at said series of velocity ratios,
   (c) applying a first normal moveout correction function dependent on said ratios to said converted P-SV seismic data for said series of ratios according to the following:

$$Tnmo = \sqrt{\left(\frac{x}{Vp} + \frac{k}{1+k}\right)^2 + T^2} + $$

$$\sqrt{\left(\frac{x}{Vp} + \frac{k}{1+k}\right)^2 + (kT)^2}$$

where:
Tnmo = normal moveout corrected time;
Vp = average compressional wave velocity;
Vs = average shear wave velocity;
k = Vp/Vs;
x = source-receiver separation; and
T = compressional wave travel time;

(d) determining shear velocity from said applied P-SV seismic data; and (e) applying a second normal moveout correction function to both compressional wave velocity and shear wave velocity according to the following:

$$Tnmo = \sqrt{\frac{Xp^2}{Vp^2} + Tp^2} + \sqrt{\frac{Xs^2}{Vs^2} + Ts^2}$$

where:
Tnmo = normal moveout travel time;
Vp = average compressional wave velocity;
Vs = average shear wave velocity;
Xp = source–CMP offset;
Xs = CMP–receiver offset;
Tp = compressional wave travel time; and
Ts = shear wave travel time.

2. The method according to claim 1 wherein the step of determining the P-SV compressional to shear wave velocity ratios of said converted data at said series of velocity ratios further comprises the step of correcting compressional wave seismic data for normal moveout;
comparing said normal moveout corrected compressional wave seismic data for each of said compressional to shear wave velocity ratio and
selecting said compressional to shear wave velocity ratio most closely correlated with said corrected compressional wave seismic data.

3. The method according to claim 2 wherein correcting said compressional wave seismic data for normal moveout is accomplished according to the following:

$$Tnmo = (x^2/Vp^2 + T^2)^{\frac{1}{2}}$$

where:
Tnmo = normal moveout corrected travel time;
Vp = average compressional wave velocity;
x = source-receiver offset; and
T = two-way normal incidence travel time.

4. In seismic exploration wherein seismic sources are activated at spaced locations along a line of exploration to generate compressional energy into a subsurface formation and the amplitude of reflections are recorded as a function of time along said line to produce a series of seismic traces, said seismic traces comprised of acquired compressional (P) wave data and converted compressional to shear (P-SV) wave data, a method of processing said seismic traces for analysis comprising the steps of:

(a) comparing said converted P-SV wave data to said P wave data;

(b) determining a series of P-SV wave to P wave velocity ratios based on said comparison;

(c) applying a first normal moveout correction function dependent on said p wave to P-SV wave velocity ratios to said P-SV data for said series of P wave to P-SV wave velocity ratios;

(d) stacking said applied P-SV data; and (e) correlating said P wave data and said applied P-SV wave data to determine the closest P wave to P-SV wave velocity ratio which includes an event closest to said P wave data.

5. The method according to claim 4 further comprising the steps of:

(a) determining shear wave velocity from said applied P-SV data;

(b) applying a second normal moveout correction function to both said acquired compressional wave velocity and said shear wave velocity; and (c) stacking said second normal moveout corrected data to combine the seismic reflections recorded along the line of exploration.

6. The method according to claim 5 wherein said second normal moveout correction function of step (b) of claim is applied to said compressional wave velocity and said shear wave velocity according to the following:

$$Tnmo = \sqrt{\frac{Xp^2}{Vp^2} + Tp^2} + \sqrt{\frac{Xs^2}{Vs^2} + Ts^2}$$

wherein:
Tnmo = normal moveout corrected travel time;
Vp = average compressional wave velocity;
Vs = average shear wave velocity;
Xp = source–QMP offset;
Xs = QMP–receiver offset;
Tp = compressional wave travel time; and
Ts = shear wave travel time.

7. The method according to claim 7 wherein said P-SV wave data is correlated in step (e) to P-wave data corrected for normal moveout to determine said P-SV wave to P wave velocity ratio.

8. The method according to claim 4 wherein each of said series of stacked applied P-SV wave data traces is compared to a stack of said P-wave data corrected for normal moveout to determine said selected applied P-SV data stack.

9. The method according to claim 4 wherein said first normal moveout correction function dependent on said compressional to shear wave velocity ratio is described according to the following:

$$Tnmo = \sqrt{\left(\frac{x}{Vp} \frac{k}{1+k}\right)^2 + T^2} + $$

$$\sqrt{\left(\frac{x}{Vp} \frac{k}{1+k}\right)^2 + (kT)^2}$$

where:
Tnmo = normal moveout corrected travel time;
Vp = average compressional wave velocity;
Vs = average shear wave velocity;
k = Vp/Vs;
x = source-receiver offset; and
T = compressional wave travel time.

* * * * *

UNITED STATES PATENT AND TRADEMARK OFFICE
CERTIFICATE OF CORRECTION

PATENT NO. : 4,881,209

DATED : November 14, 1989

INVENTOR(S) : Bloomquist et al.

It is certified that error appears in the above-identified patent and that said Letters Patent is hereby corrected as shown below:

Col. 1, line 37, "section" should be -- sections --

Col. 2, lines 35-36, Equation (1), "$t^2_{po}$" should be -- $t_{po}^2$ --, and $t^2_{so}$" should be -- $t_{so}^2$ --

Col. 8, line 39, After "displayed" insert -- or --

Col. 8, line 58, "t" should be -- the --

Col. 9, line 43, "ratio" should be -- ratios --

Col. 10, line 23, After "claim" insert -- 5 --

Col. 10, line 35, "QMP" should be -- CMP --

Col. 10, line 36, "QMP" should be -- CMP --

Col. 10, line 39, "7" should be -- 4 --

Signed and Sealed this

Thirteenth Day of August, 1991

Attest:

HARRY F. MANBECK, JR.

Attesting Officer

Commissioner of Patents and Trademarks